OPTICAL APPARATUS INCLUDING A PAIR OF MOSAICS OF OPTICAL IMAGING ELEMENTS

Original Filed July 3, 1967 3 Sheets-Sheet 1

ROBERT H. ANDERSON
INVENTOR

BY
BUCKHORN, BLORE, KLARQUIST & SPARKMAN
ATTORNEYS

ROBERT H. ANDERSON
INVENTOR
BY
BUCKHORN, BLORE, KLARQUIST & SPARKMAN
ATTORNEYS

ROBERT H. ANDERSON
*INVENTOR*

*BY*
*BUCKHORN, BLORE, KLARQUIST & SPARKMAN*
*ATTORNEYS*

United States Patent Office

Re. 28,162
Reissued Sept. 17, 1974

28,162

OPTICAL APPARATUS INCLUDING A PAIR OF MOSAICS OF OPTICAL IMAGING ELEMENTS

Robert H. Anderson, Evanston, Ill., assignor to Tektronix, Inc., Beaverton, Oreg.

Original No. 3,605,593, dated Sept. 20, 1971, Ser. No. 650,862, July 3, 1967. Application for reissue June 9, 1972, Ser. No. 261,224
Int. Cl. G03b *17/04*
U.S. Cl. 95—18 37 Claims

Matter enclosed in heavy brackets [ ] appears in the original patent but forms no part of this reissue specification; matter printed in italics indicates the additions made by reissue.

ABSTRACT OF THE DISCLOSURE

An optical apparatus for the transmission of light images is described including at least two mosiacs having a plurality of optical imaging elements, such as lenses or curved mirrors, supported in a two-dimensional array of elements and forming a plurality of light paths each containing image inverting and erecting elements in different mosiacs which transmit different portions of an image and recombine such image portions with their original relative orientation to reproduce the image of the viewed object. The optical elements may be lenses in a pair of lens mosaics including an inverting mosaic and an erecting mosaic which provide a plurality of lens pairs forming the light paths. A plurality of apertured plates are provided for preventing undesired light from reaching the composite image formed on the final image surface and the lens pairs are spaced so that adjacent image portions partially overlap and the overlapping areas coincide in the final image to provide a single, complete image. A cathode ray oscilloscope camera of extremely short length is formed using such an optical apparatus.

BACKGROUND OF THE INVENTION

The optical apparatus of the present invention may be employed as an image transmission system or as part of a recording apparatus such as a document copier or a camera for photographing the trace produced on the fluorescent screen of a cathode ray oscilloscope. In addition the present optical apparatus may also be employed in an optical projection apparatus such as a slide projector, a photograph enlarger or a wide-screen movie projector somewhat similar to the "Cinerama" type.

Lens mosaics comprising an array or matrix of rows and columns of lenses have been employed in so-called "fly's eye" cameras which produce a large number of greatly demagnified, inverted, separate multiple images of the entire object, and in image dissection devices, such as in the cryptographic encoding device of U.S. Patent 3,166,625 of C. H. Brumley, in which an unreadable scrambled image is desired. However, arrays of lenses have never before the present invention been employed to transmit the image of an object as a plurality of different image portions which are recombined in their original relative orientation on an image plane to form a single final image which is a reproduction of the object viewed. The apparatus of the present invention accomplishes this in one embodiment by employing a pair of lens arrays or mosaics, each having the same number of lenses which are positioned to form a plurality of cooperating lens pairs having one lens of each pair in an inverting lens mosaic and the other lens of each pair in an erecting lens mosaic. The image portions are transmitted through such lens pairs with a different image portion passing through each lens pair. In addition, the present optical apparatus also employs a plurality of apertured baffle plates for preventing unfocused light from passing through the space between adjacent lenses in each mosaic of lenses, for preventing light from passing through various arbitrary combinations of lenses not intended to cooperate as pairs, and for reducing scattered light. The spacing between lens pairs is such that adjacent image portions partially overlap and the overlapping areas coincide on the image plane or other image surface on which they are focused to provide a single complete final image which is an accurate reproduction of the object being viewed.

As the result of employing a pair of lens mosaics, each including a large number of lenses, the lens system of the present invention is able to view a large area on an object plane positioned a short distance from such lens system so that the length of the optical apparatus of the present invention is greatly reduced from that employing a conventional wide angle lens. As a result the optical apparatus of the present invention can be employed to provide a flat camera for recording the trace on the fluorescent screen of a cathode ray oscilloscope. For example, such an oscilloscope camera may have an object-to-image spacing of 3 to 5 inches with an object plane viewing area of 3.5 by 4.25 inches and magnification of 1 to .8 to enable photographing of the image on a standard size of "Polaroid" type film.

The lenses of the lens mosaics can be molded from plastic material or can be small, low quality glass lenses and can employ single-element lenses instead of multiple element lenses to provide a relatively inexpensive light weight optical apparatus which is capable of high quality image reproduction due to the fact that each individual lens only transmits a very small portion of the total image and is not required to provide the number of lines of resolution needed for the total composite image. Thus, even though the optical apparatus of the present invention includes many more lenses than a conventional optical apparatus employing a wide angle lens, it is less expensive and gives image reproductions of comparable quality. In addition, the present apparatus has the further advantage that the viewing field or area can be expanded substantially indefinitely merely by adding lenses without increasing the object-to-image spacing. The above advantages also apply to optical apparatus employing mirror mosaics which are similar to the lens mosaics and can be made merely by coating the curved portions of the lens mosaic plates with a light reflecting layer.

It is therefore one object of the present invention to provide an improved optical apparatus in which at least two mosaics of optical elements, such as lenses or curved mirrors, are employed to enable the transmission of an image of large area with an extremely short object-to-image spacing.

Another object of the present invention is to provide an improved lens system including a pair of lens mosaics each having a plurality of lenses supported in alignment with the lenses of the other mosaic to form lens pairs, which transmit different portions of an image and recombine such image portions with their original relative orientation to form a single final image of good quality.

A further object of the invention is to provide an improved optical apparatus including lens mosaics of molded plastic which is compact, inexpensive, and produces large area images of high quality.

An additional object of the present invention is to provide an improved camera capable of photographing relatively large objects at a short distance from such objects.

Still another object of the present invention is to provide an improved oscilloscope camera which is light weight, compact and inexpensive but which is capable of photographing high frequency signals of low brightness.

*A still further object of the invention is to provide a short optical system for a document copier apparatus.*

BRIEF DESCRIPTION OF DRAWINGS

Additional objects and advantages of the present invention will be apparent from the following detailed description of certain preferred embodiments thereof and from the attached drawings of which:

As shown in FIG. 1 the optical apparatus of the present invention includes an inverting lens array or mosaic 10 and an erecting lens mosaic 12 which each have a plurality of spherical lenses corresponding in number to the lenses of the other mosaic and forming a two-dimensional array of lenses for each mosaic. The lenses may be of the same focal length and diameter and are positioned in alignment so that each lens on one mosaic forms a lens pair with the corresponding one of the lenses on the other mosaic which lies on the same optic axis. The inverting lens mosaic 10 positioned closest to an object plane 14 or other real or imaged object surface transmits the image of an object portion 16 onto a central image plane 18 as the inverted intermediate image portions 20. The erecting lens mosaic 12 transmits the inverted intermediate image portions 20 in focus onto an image plane 22 or other image surface, as an erected final image portion 24 of the same orientation as the image of the object portion 16. Thus it can be seen that a lens 26 on the inverting lens mosaic 10 and a lens 28 on the erecting lens mosaic 12 form a lens pair which act together as an optical train which transmits a portion of the image of an object located in the object plane 14 onto the image plane 22 as an erected image portion of the same orientation as the corresponding object portion.

Figure 1:
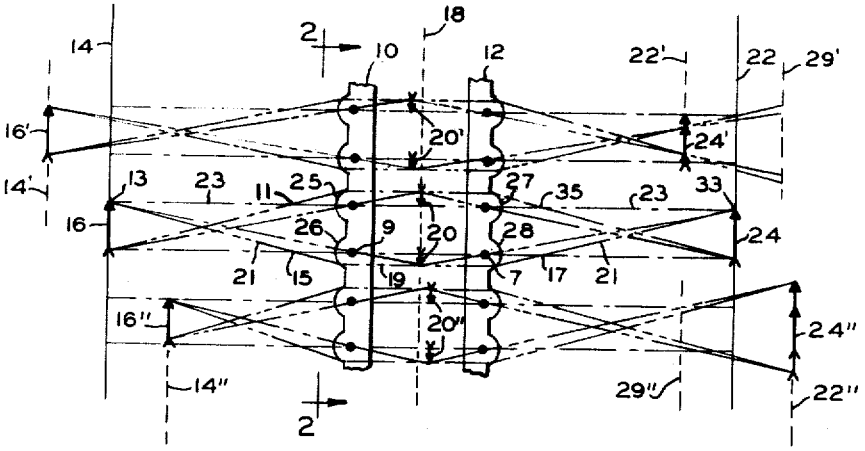
FIG. 1 is a section view of one embodiment of an optical apparatus having a lens system in accordance with the present invention, taken along the line 1—1 of FIG. 2.

In order to transmit a single complete image the viewing fields of adjacent lens pairs overlap on the object plane 14 so that the image portions transmitted through such adjacent lens pairs have partially overlapping areas in which multiple image points of a common object point must coincide on the image plane 22 where they are in focus. In the embodiment shown in FIG. 1, the field of view of the object for each lens pair, and the field of coverage of the resulting image portion, extend about to the optic axes of the adjacent lens pairs.

The meaning of focusing an image is well-known in the art, and the focal plane is a well-known term of art. The terminology and concept of a plane of coincidence, or coincidence plane for images formed by different pairs of lenses in a lens mosaic, such as the four lenses which comprise two adjacent lens pairs, is new in this invention, however, and may be defined and visualized in the following manner. Different light rays issuing from a point such as the point 13 at the upper end of object 16 may be independently traced through each of two adjacent lens pairs, such as the lens pair formed by lenses 26 and 28, and also the lens pair formed by lenses 25 and 27, in FIG. 1. One such ray 21 can be constructed to pass through the front focal point 15 and the lower edge of lens 26, with a ray segment 19 extending parallel to the optic axis between lenses 26 and 28 to pass through the lower edge of lens 28 and its rear focal point 17, and to extend to image plane 22 at the point 33 at the upper end of image 24.

A different ray 23 from the same point 13 at the upper end of object 16 may be traced in a straight line along the optic axis of the lens pair 25 and 27, which is located directly above the pair of lenses 26 and 28, and it also passes through focal points 11 and 35 to the upper end point 33 of object 24 where it intersects the previously traced ray extending from ray 21. The plane of intersection of these two rays 21 and 23 is defined as the plane of coincidence or coincidence plane. It will be seen that two identical superposed point images of a common object point within the overlapping fields of adjacent lens pairs are formed in the plane of coincidence, where they appear as a single point, because they coincide. In the instance just described for object 16, the mosaic geometry has been designed to image each point on object 16 into a point of coincidence of its separately-formed images in the plane 22, which is also the focal plane for the image 24. However, in several illustrative cases described below the focal plane does not occur in the same location as the plane of coincidence. In such cases, where two defocused images occur in the plane of coincidence, the coincidence plane is defined as the plane in which the two enlarged defocused spot images of a common object point coincide.

It will be seen that ray 21, which connects point 13, 15, 17, and 33 must be completely symmetrical on the right and left sides of the central image plane 18, and also the trapezoid formed by ray 21 and ray 23 through points 3, 11, 35 and 33 is symmetrical about plane 18: This symmetry results because lenses 26 and 28 are symmetrical and are of equal focal length, diameter, and adjacent lens spacing, and the optic axes are parallel.

Another way to illustrate this symmetry is to regard the paraxial ray 19 as a construction line representing collimated light issuing both right and left from plane 18, entering lenses 28 and 26, and by definition, passing through their focal points 17 and 15 respectively, and continuing to points 13 and 33, forming "mirror image" patterns of segments of rays on opposite sides of plane 18.

Similar triangles can be constructed to show this symmetry, wherein the triangle defined by points 11, 13 and 15 is similar to the triangle defined by points 35, 33 and 17. By means of these similar triangles and the equal lens focal lengths, it is shown that the coincidence plane distance measured from the principal point 7 of lens 28 to the coincidence plane on the right is equal to the object distance from the principal point 9 of lens 26 to the object plane on the left.

Thus, the first law of lens mosaic image formation is that, for symmetrical systems, the object distance equals the coincidence plane distance.

The finding that the lens mosaic object distance equals the above defined coincidence plane distance leads to the surprising result that a displacement of the object 16 to the left must move the plane of coincidence to the right. While it is very fundamental in optics that the focal plane moves in the same direction as a displaced object, however, the coincidence plane moves in the opposite direction. Accordingly, if object 16 were moved from one side of its location in the figure, the left side, for example, to and through its location in plane 14, and to the other side of its illustrated location, the focal plane and coincidence plane would approach each other and would coincide at plane 22, and pass through each other and then move apart.

Thus for a single complete image the coincidence plane of the adjacent lens pairs must correspond to their image plane which occurs in only one relative position of the lens mosaics with respect to the object, as shown by the case of the middle two lens pairs of FIG. 1, where the inverted real images 20 are formed midway between the inverting lens and the erecting lens and the object distance from the object 16 to the inverting lens 26 is equal to the image distance from the erecting lens 28 to the image 24 for a symmetrical lens system. However, for purposes of illustrating lens mosaic principles, in the case of the upper two lens pairs the object 16' has been moved to the left causing the inverted real images 20' also to move left and the erected images 24' to be focused on an image plane 22' which does not correspond to their coincidence plane 29', such image plane 22' being to the left and such coincidence plane 29' being to the right of their coplanar position, resulting in multiple images in the focal plane and defocusing in the coincidence plane. Also in the case of the lower two lens pairs the object 16'' has been moved to the right, causing the inverted real images 20'' to move right also and the erected images 24'' to be focused on an image plane 22'' which does not correspond to their coincidence plane 29''. In this lower case the image plane 22'' moved to the right and the coincidence plane 29'' moved to the left of their coplanar position, causing multiple imaging and defocusing.

It will be seen that since multiple imaging distortion, or image defocus, or both, occur in any case where the object and image are located other than as shown in the figure for object 16, the second law of lens mosaic image formation is that the focal plane must coincide with the plane of coincidence in order to obtain an undistorted focused composite image. When this law is satisfied in a symmetrical pair of lens mosaics, the object distance will equal the image distance as well as the coincidence plane distance.

Figure 2:
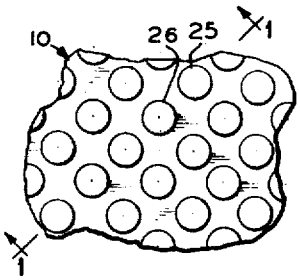
FIG. 2 is a vertical section view taken along the line 2—2 of FIG. 1, showing one of the lens mosaics.
Figure 7:
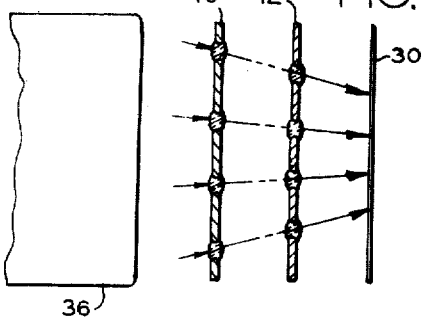
FIG. 7 is a schematic view of another embodiment of the optical apparatus of the present invention which can be used for image demagnification.

As shown in FIG. 2 each of the lens mosaics 10 and 12 includes a plurality of spherical lenses forming a two-dimensional array of lenses that may be spaced apart by substantially the same distance which may be approximately equal to the radius of one lens in order to provide uniform coverage of the object plane 14. In addition, the individual lenses of the erecting lens mosaic 12 may also be provided with the same radius of curvature and focal length as those of the inverting lens mosaic 10. This results in a symmetrical lens system having a 1-to-1 magnification in which the distance from the object plane 14 to the central image plane 18 is the same as the distance between the image plane 22 and central image plane 18. However, as hereafter discussed it is not necessary to make the optical apparatus of the present invention with a symmetrical lens system. Thus the spacing between lenses on the erecting lens mosaic 12 can be different than such spacing on the inverting lense mosaic 10 to provide low magnification or a low demagnification, as shown in FIG. 7. Alternatively it is also possible to provide the lenses on the erecting lens mosaic 12 with a different radius of curvature or focal length than those of the inverting lens mosaic 10. In such a nonsymmetrical lens system the distance between the object plane and the central image plane will not be equal to the distance between the final image plane and the central image plane. However, for simplicity the principles of operation of the present apparatus are described with reference to a symmetrical lens system.

It should be noted that while only plano-convex lenses have been shown as being employed in lens mosaics 10 and 12, any conventional type of lens may be substituted therefor. In order to reduce the cost of the lenses and to simplify mounting the lens mosaics each can be molded in a single plate of plastic material, such as methyl methacrylate. Also while single element lenses are shown, it is possible to employ more complex multiple element lenses to correct for various image aberrations in a conventional manner, such as by forming each lens mosaic of two or more molded plates of different plastic material spaced near each other or cemented together at their surfaces. However it is also possible to form such lens mosaics of a plurality of separate glass lenses attached to metal support plates in any suitable manner to provide somewhat higher quality lenses.

While a lens array of offset rows spaced apart in the diagonal direction by approximately 1½ lens diameters between centers is shown in FIG. 2 with the spacing between adjacent lenses approximately equal to one lens radius between edges, any other suitable lens array can be employed. Furthermore *a narrow two dimensioned array of lenses or* only a single row of lenses may be used for each lens array or mosaic if the [row] *array* of lenses is moved over the object to scan the entire object *by any suitable scanning means such as that used in a document copier,* or is fixed in location over a narrow object. *The location of an image point does not move when both lenses of a lens pair are displaced together in a direction transverse to the optic axes.* Also while it is ordinarily desirable to provide all the lenses of a particular lens mosaic with the same focal length so that they will all focus on the same object and image planes, it is possible to provide a portion of the mosaic plate with lenses of different focal lengths. This might be done to focus one portion of the image on a ground glass viewing screen positioned generally adjacent to, but in a somewhat displaced different plane than the film on which the remainder of the image is recorded, such as when viewing or "previewing" a waveform on an oscilloscope before photographing such waveform. For example, the top centimeter of a cathode ray tube viewing screen may be separately imaged for previewing. In order to prevent the light transmitted through the preview portion of the erecting lens mosaic from exposing the film due to light pipe coupling to the other portion of such mosaic, a removable dark slide can be positioned between such film and the erecting lens mosaic during previewing. Alternatively, the shutter can be removed from its position between the lens mosaics in FIG. 5 hereafter discussed, to the space between the film and the erecting lens mosaic. Another possible construction would be to provide the previewing portion of the erecting lens mosaic and the ground glass viewing plate in a different compartment of the camera housing so that such previewing portion is separate from the recording portion of erecting lens mosaic which records the image on film.

In addition it is possible that the inverting and erecting lens mosaics can be formed so that the focal lengths of the lenses decrease with increases in height along the lens mosaic in order to provide a camera whose film axis is skewed or tilted, and whose film containing back portion is raised with respect to the axis of the cathode ray tube to prevent the camera from obscuring the view of, and the access to, the control knobs of the oscilloscope beneath such camera. In such a skewed camera the distance between the object plane and the inverting lens mosaic, as well as the distance between the image plane and the erecting lens mosaic will vary along the height of the camera with the distance progressively decreasing from the bottom to the top of the camera. Also the image and object planes and the planes of the lens mosaics would intersect in a line above the top of the cathode ray tube. Therefore it can be seen that the optical apparatus of FIG. 1 is only one example of a large number of embodiments which can employ the principles of the present invention.

Figure 3:
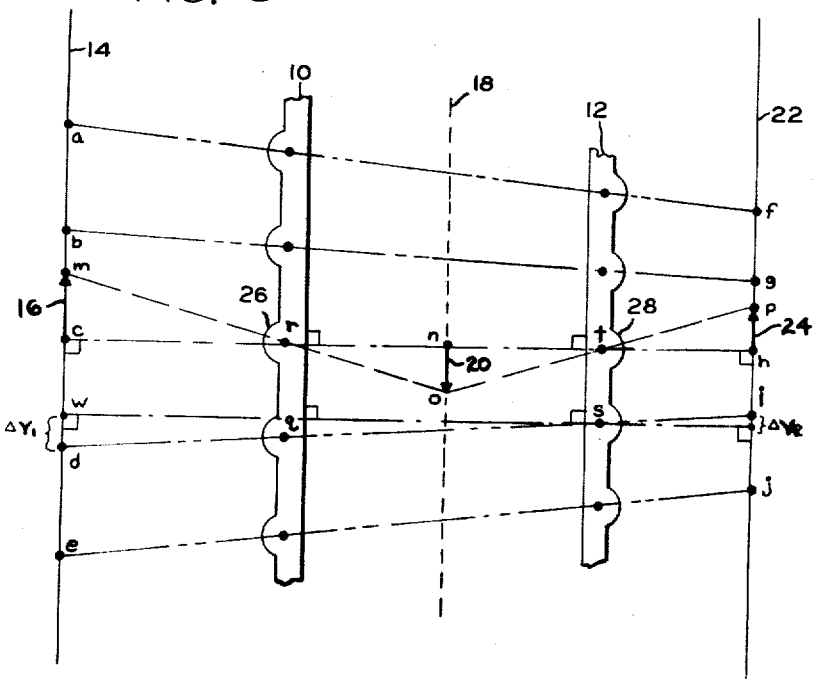
FIG. 3 is a schematic diagram illustrating the operation of the lens system of the optical apparatus of the present invention.

The principles involved in the operation of the lens system of the present invention will be discussed with reference to FIG. 3. The converging optic axes of FIG. 3 illustrate the general case in which the lens spacings differ in the two mosaics, as in FIGS. 7 and 9, but the rules for dimensional relationships derived in FIG. 3 also apply to the special case of FIGS. 1 and 2, where the optic axes are parallel, and the lens spacing is the same in both mosaics. While the present invention should not be limited to the following theory of operation, it is believed that an explanation of such theory will be helpful in understanding the principles underlying the optical apparatus of the present invention. As a general rule the total magnification of the overall lens mosaic optical system must be equal to the product of the magnifications of the two individual lenses of a lens pair in order to obtain coincidence of overlapping image portions and focus of such portions in the same plane, which is necessary to form a single complete image.

New terminology will be used to depict the pattern of an imaginary grid or lattice of crossed construction lines on the object plane 14, chosen so that each intersection, or node, of the lattice lies on the optic axis of a pair of lenses in the lens mosaics. If such a lattice were actually drawn on an object plane, an image of the lattice would appear in the image plane. The entire lattice may be regarded as imaged with a certain magnification by the entire lens mosaic system, while the points at and near each intersection, or node, of the lattice may be regarded as imaged with a certain magnification primarily by the lens pair on whose optic axis the node lies. The term "lattice magnification" used hereafter refers to the ratio of the height of an entire extended-area object in the object plane 14 divided into the height of the corresponding entire image produced on the image plane 22, while the term "nodal magnification" refers to the total magnification of a lens pair for the limited object portion covered by the particular lens pair, which is given by the product of the magnification of one lens multiplied by the magnification of the other lens of such pair. Thus the third law of lens mosaic image formation is that the nodal magnification must equal the lattice magnification.

This law simply expresses the fact that the separate image portions will overlap in coincidence only if the size of each image portion has been magnified by the same amount as the spacing between the image portions. A mathematical expression of this law is derived, which will teach how to choose the spacing between lenses of the two differently spaced lens mosaic plates, for a particular spacing between plates and object and image distances, so that a lens mosaic camera or other optical system having a particular magnification can be constructed. As shown in FIG. 3 this law may be derived as follows. The points a, b, c, d, and e represent the nodes of a lattice formed on an object by the intersection of the construction lines shown, with the object plane 14. These construction lines are the optical axes of the lens pairs. Points f, g, h, i, and j are the nodes of the image lattice formed by such construction lines on the image plane 22. Where the entire object is to be reduced in size by an 0.8 times demagnification, for example, the distance f-to-j in the image will be 0.8 times of the distance a-to-e in the object. This is a 0.8 to 1 "lattice magnificaiton." A portion cm of the object will be imaged at no on the intermediate plate 18 and re-imaged at hp on the final image plane 22, by the inverting-erecting lens pair lying on axis ch. The incremental image height hp is demagnified from its object height cm by a "nodal magnification" equal to the magnification of the inverting lens 26 multiplied by the magnification of the erecting lens 28.

The lattice magnification is dependent on the convergence of the optic axes, but is independent of the power of the lenses, and is determined in the following way. Referring to FIG. 3 where line ch is perpendicular to plane 14, the slope (z) of line di relative to line ch is $$z=\frac{rq-ts}{rt}$$

where r, q, t, and s are the principal points in the lenses shown. (The lenses are treated as "thin lenses," with principal points arbitrarily taken within the lens, as shown.) A line ws is constructed parallel to line ch, so lines ws and ch are perpendicular to planes 14 and 22, and to mosaics 10 and 12. Having found this slope (z), cd is larger than ts by the amount $\Delta Y_1$. Since $$z=\frac{\Delta Y_1}{sw}$$

and $sw=tc$, $\Delta Y_1=tc\cdot z$ or $$\Delta Y_1=tc\,\frac{(rq-ts)}{rt}$$

so cd may be expressed $$cd=ts+\Delta Y_1,\text{ or } cd=ts+tc\left(\frac{rq-ts}{rt}\right)$$

(Equation 1)

Also from the slope, hi is similar than ts by the amount $\Delta Y_2=th\cdot z$, or $$\Delta Y_2=th\left(\frac{rq-ts}{rt}\right)$$

Therefore $$hi=ts-\Delta Y_2,\text{ or } hi=ts-th\left(\frac{rq-ts}{rt}\right)$$

(Equation 2)

Since the lattice magnification, $M_L$, may be expressed entirely in terms of lens spacing dimensions, as $$M_L=\frac{hi}{cd}$$

then by substituting Equations 1 and 2 int othis expression for $M_L$, $$M_L=\frac{ts-th\left(\frac{rq-ts}{rt}\right)}{ts+tc\left(\frac{rq-ts}{rt}\right)}\qquad\text{(Equation 3)}$$

which is the lattice magnification.

The nodal magnification of a series of coaxial lenses is the product of the separately determined magnifications of each lens. For each lens of the lens pair of FIG. 3, the magnification is, by definition, the ratio of the image to object height, or $$M_1=\frac{no}{cm}\text{ and }M_2=\frac{hp}{no}$$

Since the magnification of two lenses is $M_n=M_1\cdot M_2$, therefore the product in terms of image height is $$M_n=\frac{no}{cm}\cdot\frac{hp}{no}=\frac{hp}{cm}$$

Of more importance, since $$\frac{no}{cm}=\frac{nr}{rc}\text{ and }\frac{hp}{no}=\frac{th}{nt}$$

the nodal magnification $M_n$ may alternatively be expressed in terms of lens spacing as $$M_n=\frac{nr}{rc}\cdot\frac{th}{nt}\qquad\text{(Equation 4)}$$

We now have both nodal and lattice magnifications in terms of lens spacing dimensions. Since $M_n=M_L$, the relationship between dimensions of the lens spacing is given by substituting Equation 3 and Equation 4 into the expression $M_n=M_L$, or $$\frac{nr}{rc}\cdot\frac{th}{nt}=\frac{ts-th\left(\frac{rq-ts}{rt}\right)}{ts+tc\left(\frac{rq-ts}{rt}\right)}\qquad\text{(Equation 5)}$$

This equation expresses the conditions of lens spacing which must be satisfied to form the complete reconstructed image by means of the lens mosaic optical system of FIG. 3.

It has been found for a symmetrical lens system in accordance with FIG. 1, with an erecting lens mosaic 12 identical to the inverting lens mosaic 10, with all of the lenses of the same focal length, and with adjacent lenses spaced apart by a distance between their edges equal to the radius of one of the lenses, that in one practical camera design, the optical path between the object plane 14 and the image plane 22 should be equal to 10⅔ times the focal length of the lenses when the spacing between the principal points of the inverting lenses and the object mosaics is 2⅔ focal lengths, and the spacing between the principal points of the iinverting lenses and the object plane and the spacing between the principal points of the erecting lenses and the image plane are both four focal lengths. This configuration will permit the field covered by each lens pair to extend to the axis of the closest adjacent lens pair, so that satisfactory uniformity of brightness of the final composite image is obtained, due to the substantial overlap of image portions between the axes of adjacent lens pairs, and of image portions between the axes of any four adjacent lens pairs, which lie on the corner of a square.

One other specific lens system employed lens mosaic plates having lenses 2.4 millimeters in diameter with a radius of curvature of 3.75 millimeters and a focal length of 7.25 millimeters provided in 45 rows with alternate rows of 19 lenses and 18 lenses each. The distance between the centers of lens rows was equal to the diameter of a lens, as measured horizontally or vertically in FIG. 2, making a total of 833 lenses over a rectangular array area of approximately 108 millimeters by 88.8 millimeters. The lens plate was molded from a single flat sheet of plastic, such as methyl methacrylate, having a thickness of 0.6 inch and overall dimensions of 5.3 inches by 4.1 inches. This optical system is employed in an oscilloscope camera with the distance between the object plane at the phosphor screen of the cathode ray tube and the image plane at the film of the camera being approximately 4.2 inches.

Figure 4:
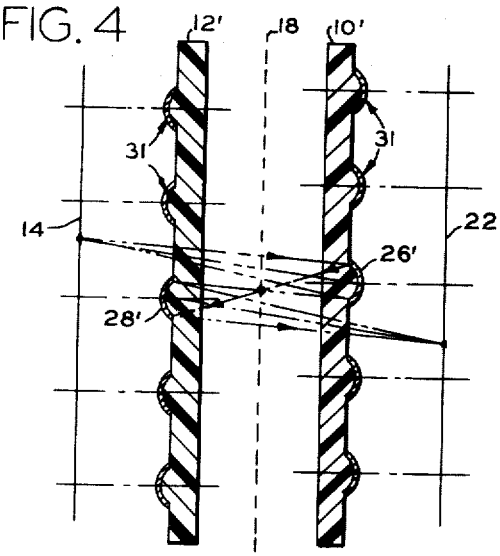
FIG. 4 is a side view of another embodiment of the present optical apparatus employing curved mirrors for the optical elements of the mosaics.

As shown in FIG. 4 the optical elements of the two-dimensional arrays of element forming mosaics 10' and 12 may be concave curved mirrors 31 instead of lenses. The mirrors are spherical mirrors which may be formed by coating the surfaces of the spherical lens projections 26 and 28 on the plastic mosaic plates 10 and 12 of FIG. 1, with aluminum, silver or other opaque light reflecting material, such as by vapor deposition through a mask. Also a black nonreflecting coating of black paint, anodized aluminum, carbon or other suitable material may be applied over the mirror layer 31 to prevent undesirable back reflections. The flat areas between the mirrors 31 are left uncoated to enable light to be transmitted through these areas of the transparent plastic mosaic plates. It should be noted that the inverting mirror mosaic 10' and the erecting mirror mosaic 12' are reversed in position from that of FIG. 1 because the light image emitted from the object plane 14 is reflected from the inverting mirror 26' to the erecting mirror 28' and re-reflected to the image plane 22. Also while each pair of inverting and erecting mirrors is in a single common light path extending between the object plane and the image plane, the mirrors of each mirror pair are not in horizontal alignment but are displaced a distance approximately equal to a lens radius. Alternatively, this horizontal alignment can be achieved by tilting the mirrors so that the central light ray reflected from mirror 26' to mirror 28' is horizontal for all mirror pairs. However such mirror mosaics would be more difficult to make.

As shown in FIG. 4 a light ray transmitted from the object plane through the erecting mosaic 12' above the erecting lens 28' is directed to the image plane 22 through the inverting mosaic 10' below the inverting mirror 26'. The light ray passes across the distance between the mosaics 10' and 12' three times before it completes its journey along the "folded" light path. As a result of this an optical apparatus employing the mirror mosaics of FIG. 4 is of even shorter length than one employing the lens mosaics of FIG. 1. In a symmetrical system the erecting mirror 28' forms a focused image of the rim of the inverting mirror 26' approximately halfway between such erecting mirror and the image plane 22 so that a shutter or aperture plate, like those shown in FIG. 5, may be located at this approximate halfway position.

Figure 5:
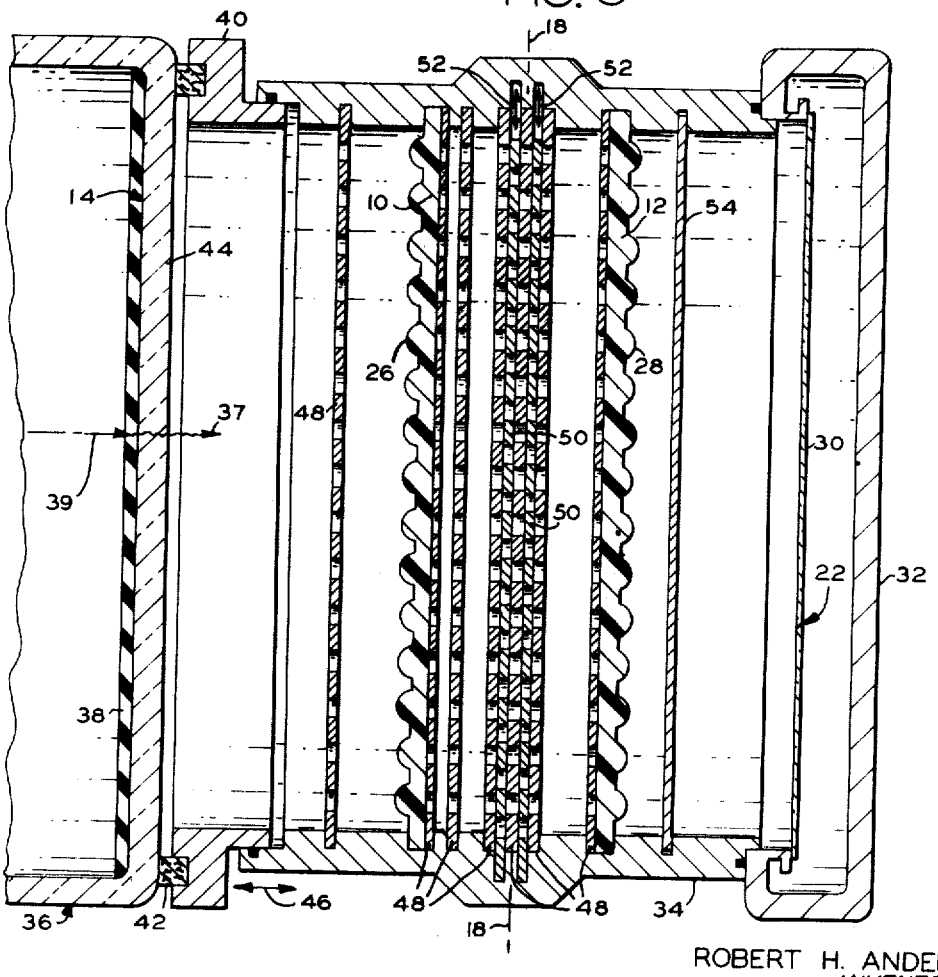
FIG. 5 is an enlarged sectional view of a cathode-ray oscilloscope camera using the lens system of FIG. 1.

As shown in FIG. 5, a cathode ray oscilloscope camera made in accordance with the present invention has a lens system in accordance with FIG. 1 including the inverting lens mosaic 10 and the erecting lens mosaic 12 with a light sensitive element 30 such as a photographic film positioned in the image plane 22. The film 30 is supported in a conventional manner inside a light opaque camera back 32 which is releasably attached in a conventional manner to a main camera housing 34 within which the lens mosaics are supported. The film 30 may be of the self-developing type so that it is developed by applying developing materials to the film, within the camera back 32. A dark slide or other light opaque member not shown may be provided on the camera back 32 between the film and the main camera housing 34 to prevent exposure of the film when the camera back is removed from the camera. A cathode ray tube 36 within the oscilloscope to which the camera is attached in a conventional manner, is positioned so that the phosphor layer 38 of its fluorescent screen is positioned in the object plane 14 to enable photographing of the light traces 37 of electrical signal waveforms formed on such fluorescent screen by an electron beam 39 within such tube. Thus a front end portion 40 of the housing for the camera is attached to the front panel of the oscilloscope by a suitable mounting or hinge mechanism not shown, and may be provided with a resilient sealing ring 42 of plastic or rubber to provide a light-tight seal with the face plate 44 of the cathode ray tube. It should be noted that while conventional oscilloscope cameras are hinged to swing horizontally to the side of the cathode ray tube for direct viewing by the operator, it is possible with the light weight, flat camera of the present invention to mount such camera to swing vertically upward into a storage position on top of the oscilloscope when not in use. Also because of its relatively inexpensive construction, the present camera may be provided as a permanent attachment to the oscilloscope, rather than being shared between several oscilloscopes, to eliminate inconvenience due to camera unavailability.

The main camera housing 34 may be slidably mounted on the front end portion 40 to enable longitudinal movement in the direction of arrows 46 for focusing purposes to compensate for any buckling of the film or variation in thickness of the tube face plate 44. A plurality of similar apertured metal plates 48 are provided within the camera housing supported in position so that the apertures in such plates are in alignment with the lens pairs of the lens mosaics. As shown, one of the apertured plates 48 may be provided between the inverting lens mosaic 10 and the object plane 14 in a stop image plane where the image of the erecting lens mosaic 12 is focused by the inverting lens mosaic, in order to prevent the solid portions of the apertured plate from intercepting or blocking any portion of the useful viewing field of the lens pairs. In a similar manner six additional apertured plates 48 may be provided between the inverting lens mosaic 10 and the erecting lens mosaic 12 with their apertures in alignment to form a plurality of sets of apertures, each set being aligned with a different lens pair. The apertured plates 48 are employed to prevent light from passing through the transparent mosaic plates to the film 30 by way of the flat areas between adjacent lenses, to reduce scattered light, to prevent light transmited through the inverting lens of one lens pair from being directed through the erecting lens of another lens pair, which would result in multiple imaging, and to cooperate with apertured plates 52 to form a light-tight closable shutter. Thus the apertured plates help each lens pair to transmit a different portion of the object image from the object plane to the image plane, where such image portions are recombined in their original orientation to provide a total image which is a reproduction of the total object. In order to provide a complete image on the film 30 having satisfactory brightness uniformity, it is necessary that adjacent image portions overlap and that all multiple images of each common object point in the overlapping areas coincide with each other on the image plane. This is done by providing the proper spacing between the lenses on each mosaic plate, as well as choosing the other optical dimensions to satisfy the laws of lens mosaic image formation. Thus, when employing the lens mosaic of FIG. 2, the image portions of the outer four lenses partially overlap the image portion of the center lens of each five lens group. It may be advantageous that the brightness of each of the overlapping image portions is permitted to decrease at the edges of each image portion, as it tends to do due to vignetting, so that an approximately uniformly bright composite image results, rather than a pattern of too sharply defined dots.

*It is well known that the placement of a field stop in an intermediate image plane is a necessary and sufficient condition to avoid vignetting. Thus, the omission of a field stop in or near that location assures the desired vignetting, in some embodiments. This art is described in "Instrumental Optics" by Boutry and Auerbach, Interscience Publishers Inc., New York, 1962, page 302, lines 2, 3, and 4.*

A pair of movable shutter plates 50 are provided between the lens mosaics 10 and 12, such shutter plates being provided with a plurality of apertures corresponding in number to the lens pairs, so that when the shutter plates are moved from the closed position shown in FIG. 5 to an open position, the apertures of the shutter plates are in alignment with the apertures in the fixed aperture plates 48. The movable shutter plates 50 together with the three fixed aperture plates 48 positioned on opposite sides thereof form a new type of shutter, such shutter being a type of between-lens focal plane shutter located in the vicinity of the intermediate image plane 18 shown at a position halfway betwen the shutter plates. Thus, when the shutter plates 50 are slid upward in the direction of arrows 52 into engagement with a stop, the apertures in shutter plates line up with the apertures in the fixed apertured baffle plates 48 and the light image produced on the phosphor screen 38 is transmitted through the lens matrices and such shutter onto the film 30 to record such image. It should be noted that the shutter plates 50 only move a very short distance, approximately equal to the spacing between adjacent lenses so that such shutter is capable of extremely short exposure times.

In addition the camera of FIG. 5 also contains an auxiliary dark slide 54 between the erecting lens mosaic 12 and the film 30, which blocks any light transmitted through the lenses to prevent exposure of the film during repair, replacement, or adjustment of camera parts, or due to light leakage or accidental opening of the shutter when the camera is not in use. Alternatively, this dark slide could be provided at the front end of the camera between the inverting lens mosaic and the image plane. In addition, it should be noted that while the erecting lens plate 12 is shown with its lenses on the light output side adjacent to the film 30, such mosaic can be reversed in position, from that shown, to locate the lenses on the light input side of the plate. This may be desirable if the two lens mosaics 10 and 12 are plastic lens plates molded from the same mold, because in this reversed position certain mold defects, such as slight errors in the location of the lenses, will cancel and not distort the recorded image. This advantage occurs because the location of an image point does not move when both lenses of a lens pair are displaced together in a direction transverse to the optic axes.

Figure 6:
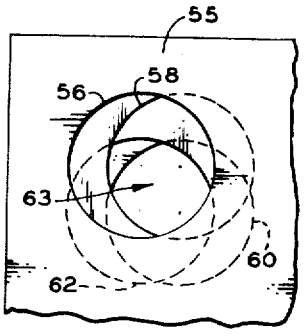
FIG. 6 is a diagrammatic view of a portion of an adjustable f-stop mechanism which can be employed in the camera of FIG. 5.

In FIG. 6, it is shown how to provide the oscilloscope camera of FIG. 5 with an adjustable f-stop by employing four apertured f-stop plates 55 whose apertures 56, 58, 60 and 62, respectively, may be adjusted slightly out of alignment with respect to one another so that the cross sectional area 63 of the light path through such f-stop plates is changed while maintaining a generally circular shape. The f-stop plates are provided with a similar number of apertures to the apertured plates 48 and corresponding to the lens pairs, so that a different adjustable f-stop aperture is provided for each lens pair. This set of adjustable f-stop plates could be employed in place of the apertured plates 48 positioned in front of the inverting lens mosaic 10 in the camera of FIG. 5. However, on most oscilloscope applications such an adjustable f-stop is not needed to prevent over-exposure because the brightness of the waveform trace can be varied by adjustment of the oscilloscope.

As shown in the schematic diagram of FIG. 7, the oscilloscope camera may be provided with demagnification so that the self-developing film 30 may be of a standard size which is slightly smaller than the face plate of the cathode ray tube. This demagnification may be accomplished by positioning the lenses in the erecting lens mosaic 12 closer together than the spacing between the lenses in the inverting lens mosaic 10, and providing that the demagnification of each lens pair (the nodal magnification or demagnification) is equal to the over all demagnification (lattice magnification or demagnification) due to the converging optic axes of the lens pairs. Of course the lens mosaics may be formed by a plurality of separate glass lenses which are held in a metal support plate, as shown in FIG. 7, rather than the molded plastic lens mosaics of FIG. 5. However, if it is desired to use [the same] *two similar* molded plastic lens [plate] *plates* for the inverting lens mosaic 10 and for the erecting lens mosaic 12, low demagnification can be accomplished in the manner of FIG. 8 by employing a single, large plano-concave or other diverging lens 64 between the cathode ray tube and the inverting lens mosaic 10, and a single large plano-convex or other converging lens 66 between the film and the erecting lens mosaic 12. This will enable a low demagnification sufficient to provide an image on the film of .9 or .8 times as large as the object.

Figure 8:
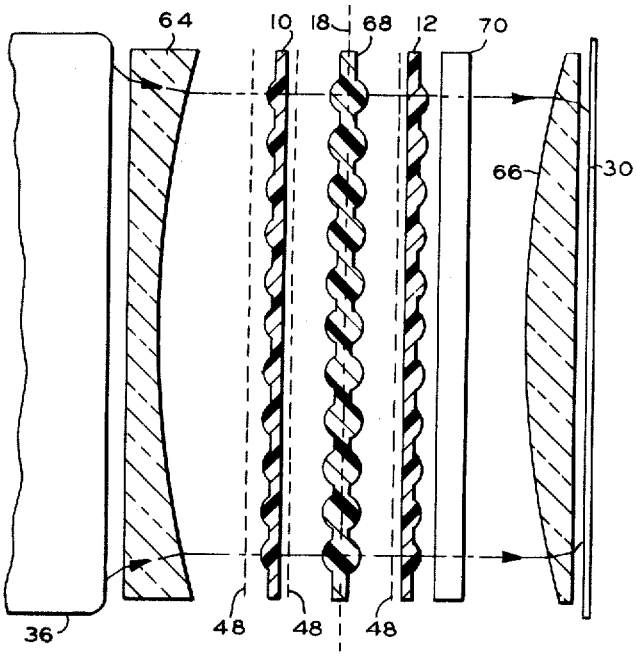
FIG. 8 is a further embodiment of the present optical apparatus which can also be used for low demagnification.

In addition, it may also be desirable to employ a field lens between the inverting lens mosaic 10 and the erecting lens mosaic 12 in order to increase the amount of light transmitted through the lens pairs. As shown in FIG. 8 this field lens may also be a lens mosaic 68 having a plurality of double convex spherical lenses molded into its outer surface, such lenses being positioned in alignment with the lens pairs formed by the lenses on the inverting lens mosaic 10 and the erecting lens mosaic 12. The field lens mosaic 68 is positioned with its common vertical axis in alignment with the central image plane 18 and may be provided with lenses of greater diameter and different focal length than the image inverting and erecting lenses. The field lens mosaic operates in the manner of a conventional field lens to redirect a portion of the light transmitted through the inverting lens which would ordinarily fall outside of the edge of the erecting lens or strike the apertured plates 48 and not pass through the erecting lens, so that such redirected light does pass through the erecting lens to increase the brightness of the image formed on the image plane of film 30. When employing such a field lens mosaic, the inverting and erecting lenses may be repositioned and the length of the camera may be materially shortened so that the object-to-image spacing of the oscilloscope camera of FIG. 5 can be as low as 3.1 inches.

When the field lens mosaic 68 is employed between the inverting lens mosaic and an erecting lens mosaic, it may be desirable to position a shutter assembly 70 between the erecting lens mosaic 12 and the film 30 because there is less room for the shutter between the lens mosaics 10 and 12. The shutter assembly 70 is located near a stop image plane where the image of the inverting lens mosaic 10 is focused by the field lens mosaic [28] *68 and the erecting lens mosaic 12*, in order to prevent the shutter plates from blocking any image light when the shutter is open. *As shown in FIG. 8, the shutter 70, when open, also functions as an apertured baffle plate in the image-space between the erecting lenses 12 and the final image plane 30 in a manner similar to the image-space baffle plate described in the embodiment of FIG. 4. The object-space baffle plate 48 described in the embodiment of FIG. 5 operates in the same manner as an image-space baffle plate and is generally interchangeable with it, since the rays are symmetrical in image space and object space. Baffles may be advantageously employed in either or both regions.*

Figure 9:
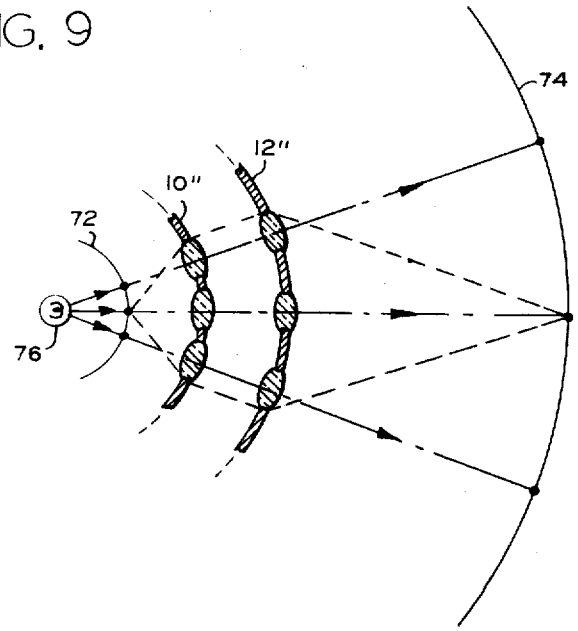
FIG. 9 is a schematic diagram of still another embodiment of the present invention which can be used as an image projector of high magnification.

While the optical system of the present invention may employ planar lens mosaics and apertured plates which are supported in parallel relationship, this is not essential. As shown in FIG. 9, a motion picture projector in general of the extra wide screen or "Cinerama" type but requiring only a single projector may be provided employing the optical system in the present invention having cylindrically curved lens mosaics 10'' and 12'' employing a single row of lens pairs. The curved lens mosaics may be formed of molded plastic or of a plurality of glass lenses held in a curved metal plate, as shown. In this embodiment of the invention the film of the projector is provided on an object surface 72 which is curved in place of the flat object plane of FIG. 1. Also a projection screen is positioned at a curved image surface 74 in place of a flat image plane. An arc lamp or other light source 76 projects light through the film 72 in a conventional manner to produce a light image which is then divided into a plurality of separate image portions by the lens pairs formed by the inverting lens mosaic 10'' and the erecting lens mosaic 12'' and focused on the projector screen 74 in a highly magnified condition, due to the divergence of the optic axes, relating to the curvature of the lens mosaics, and the magnification of the lens pairs. Here again, in order to provide a complete image on the projector screen, the transmitted image portions must overlap and the overlapping areas must coincide when they are focused on the projector screen. Also the erecting lenses can advantageously be of larger diameter and of a greater focal length than the inverting lenses, to enable the projector screen to be positioned a much greater distance from the erecting lens mosaic than the film to inverting lens spacing, as would be necessary in a motion picture theatre. It should be noted that the lens system of FIG. 9 will magnify in the direction parallel to the plane of the drawing, and also in the direction perpendicular to the plane of the drawing. Also the lens pairs having diverging optic axes may be mounted in lens barrels instead of on curved plates. Spherically curved lens mosaics as well as object and image surfaces can also be employed in optical devices to prevent distortion and at the same time to provide high magnification or demagnification.

While the various embodiments described have different magnifications and other different structural and functional features, in order to obtain useful images each embodiment satisfies the three newly discovered laws of lens mosaic image formation, which are as follows: (1) the focal plane must coincide with the plane of coincidence; (2) the nodal magnification must equal the lattice magnification; and (3) in symmetrical systems, the object distance must equal the coincidence plane distance.

It will be obvious to those having ordinary skill in the art that many changes may be made in the detailed above described preferred embodiments of the present invention without departing from the spirit of the invention. For example, it is possible to form the inverting lens mosaic and the erecting lens mosaic on the opposite sides of a single piece of plastic with the central image plane located in the middle of such plate. In addition, it is also possible to effectively provide air filled lenses by filling the space between the object plane and the inverting lens mosaic as well as the space between the erecting lens mosaic and the image plane with plastic, and removing the lens plates. In addition the entire space between the object plane and the image plane may be filled with solid plastic material to provide an extremely rugged type camera for use in recording unmanned space ship landings or airplane crashes, merely by employing laminated plates of different refractive material to form the lens mosaics and the apertured plates of light opaque plastic with a small space being provided for a focal plane shutter in front of the film. As another obvious modification it should be noted that the converging and diverging imaging systems described will operate in reverse as diverging and converging systems, respectively, by interchanging the object surfaces with the image surfaces described. Therefore the scope of the present invention should only be determined by the following claims.

I claim:

1. An optical apparatus comprising:

at least two optical mosaics each including a plurality of optical imaging elements positioned in a two-dimensional array of said elements to provide a plurality of separate light paths between an object surface and an image surface, said light paths each being formed by at least a pair of optical elements including an image inverting element and an image erecting element in different mosaics;

first means for supporting said mosaics with said optical elements in proper spaced relationship with respect to said object and image surfaces so that different image portions of the light image of an object on said object surface are transmitted through each of said light paths and said image portions are recombined on the image surface in focus and with their original relative orientation; and second means for spacing the optical elements from each other and for directing the viewing fields of the pairs of elements so that said image portions partially overlap and the overlapping areas of the image portions coincide with each other on the image surface to form a final composite image which is a complete reproduction of the image of said object.

2. An optical apparatus in accordance with claim 1 in which the inverting elements are all provided in the same inverting mosaic *and the erecting elements are all* provided in the same erecting mosaic[, and which also includes a second means for spacing the optical elements from each other and for directing the viewing field of each element so that said image portions partially overlap and the overlapping areas of the image portions coincide with each other on the image surface to provide the final composite image as a complete reproduction of the image of said object].

3. An optical apparatus in accordance with claim 1 in which the first means supports the mosaics at the proper distance from an object plane so that the focal plane of the final image is the same as the coincidence plane of said overlapping areas of the image portions while the second means spaces the optical elements and directs their viewing fields so that each overlapping image area is transmitted through several light paths as a plurality of similar images which are superimposed over each other on the image surface.

4. An optical apparatus in accordance with claim 3 in which the nodal magnification, as herein defined, of the optical imaging elements in the same light path equals the lattice magnification, as herein defined, of the entire optical system forming the final composite image.

5. An optical apparatus in accordance with claim 2 in which the optical elements are curved mirrors.

6. An optical apparatus in accordance with claim 2 in which the optical elements are lenses.

7. An optical apparatus in accordance with claim 6 in which the lenses form a pair of lens mosaics including an inverting lens mosaic and an erecting lens mosaic, each mosaic including a plurality of spherical lenses positioned so that each of the lenses of one mosaic is aligned with a different one of the lenses of the other mosaic to form a plurality of lens pairs with each lens pair providing one of said light paths.

8. An optical apparatus in accordance with claim 7 in which the second means includes a plurality of apertured plates at least some of which are positioned between the pair of lens mosaics and each having a plurality of apertures of approximately the size of the lenses of said mosaics, said plates being positioned with the apertures of different plates in alignment to provide a plurality of sets of aligned apertures with each set of apertures being aligned with a different lens pair.

9. An optical apparatus in accordance with claim 7 in which the inverting lens mosaic is provided on a member separate from that on which the erecting lens mosaic is provided.

10. An optical apparatus in accordance with claim 8 in which at least some of the lenses of a lens mosaic are of the same focal length and the second means also includes an apertured plate positioned between the object surface and the inverting lens mosaic.

11. An optical apparatus in accordance with claim 8 in which the second means also includes an adjustable f-stop means provided by a plurality of apertured stop plates each having a plurality of apertures corresponding in number to the lenses of said lens mosaics and means for adjusting the alignments of said stop plates with respect to the corresponding lenses and each other in order to vary the amount of light transmitted through said lenses to the image surface.

12. An optical apparatus in accordance with claim 8 in which the second means also includes a shutter means formed by at least one fixed shutter plate and at least one movable shutter plate, said shutter plates each having a plurality of apertures with the apertures of the fixed shutter plate being provided in different ones of the sets of aligned apertures and means for moving the apertures of the movable shutter plate in and out of alignment with said sets of apertures to open and close the shutter.

13. An optical apparatus in accordance with claim 8 which also includes a third lens mosaic positioned between the inverting lens mosaic and the erecting lens mosaic, said third mosaic having a plurality of lenses each aligned with a different lens pair and acting as a field lens.

14. An optical apparatus in accordance with claim 9 in which the lens mosaics are planar and substantially parallel to object and image planes and the total magnification of the entire optical system is equal to the product of the magnification of one lens multiplied by the magnification of the other lens of a lens pair.

15. An optical apparatus in accordance with claim 9 in which the lenses of the inverting mosaic are substantially identical and the lenses of the erecting mosaic are also substantially identical.

16. An optical apparatus in accordance with claim 15 in which the spacing between adjacent lenses on the erecting mosaic is different than that between adjacent lenses on the inverting mosaic to provide magnification or demagnification of the image produced on the image plane.

17. An optical apparatus in accordance with claim 16 in which the lenses of the erecting mosaic are of a different focal length than those of the inverting mosaic.

18. An optical apparatus in accordance with claim 16 in which the lens mosaics, the object surface and the image surface are curved.

19. An optical apparatus in accordance with claim 15 in which the spacing between lenses on both mosaics is substantially the same and which also includes at least one conventional single lens of low power and substantially the same size as the lens mosaics to provide low magnification or demagnification.

20. An optical apparatus in accordnce with claim 7 which also includes means for supporting a photosensitive element at the image surface to record the recombined image projected on said image surface.

21. An optical apparatus in accordance with claim 20 in which the photosensitive element is a photographic film and which includes a light opaque housing containing the said film, the lenses mosaics and a shutter means for enabling a light image of the object to be transmitted through said lens mosaics to said film when said shutter means is open.

22. An optical apparatus in accordance with claim 21 and including means for attaching said housing to a cathode ray oscilloscope so that the trace produced on the fluorescent screen of a cathode ray tube in said oscilloscope, is positioned at the object surface to photograph the image of such trace on said film.

23. An optical apparatus in accordance with claim 22 in which the housing contains means for applying developing materials to the film within said housing.

24. An optical apparatus in accordance with claim 22 which also includes means for adjusting the distance between the inverting lens mosaic and the object surface to focus the trace on the film.

25. An optical apparatus comprising:

at least two optical mosaics each including a plurality of optical imaging elements positioned in a two-dimensional array of said elements to provide a plurality of separate light paths between an object surface and an image surface, said light paths each being formed by at least a pair of optical elements including an image inverting element and an image erecting element in different mosaics;

first means for supporting said mosaics with said optical elements in proper spaced relationship with respect to said object and image surfaces so that different image portions of the light image of an object on said object surface are transmitted through each of said light paths and said image portions are recombined on the image surface in focus and with their original relative orientation; and second means for spacing the optical elements from each other and for directing the viewing fields of the pairs of elements so that said image portions partially overlap and the overlapping areas of the image portions coincide with each other on the image surface to form a final composite image which is a complete reproduction of the image of said object, and for supporting the mosaics and the optical elements so that the nodal magnification formed by the multiplication product of the individual magnifications of the optical elements in the same light path equals the lattice magnification of the entire optical system formed by the ratio of the height of the complete image on the image surface divided by the height of the complete object on the object surface.

*26. An optical apparatus in accordance with claim 13 wherein said field lenses have a different focal length than the inverting lenses and the erecting lenses.*

*27. An optical apparatus in accordance with claim 6 in which at least some of said lenses consist of multiple-element composite lens assemblies comprised of a plurality of closely spaced or contacting lens elements whereby the quality of imaging is improved.*

*28. An optical apparatus in accordance with claim 1 in which said image inverting elements are provided at one surface of a relatively thick member of optical material and said image erecting elements are provided at the opposite surface of said member whereby an intermediate image is formed within the optical material and a final image is formed outside of the optical material.*

*29. An optical apparatus in accordance with claim 1 wherein said coincidence of overlapping areas of image portions provides that multiple image points of each common object point are superimposed in registration on the composite image plane.*

*30. An optical apparatus according to claim 2 which also includes at least one apertured plate located in or near at least one of the planes of the inverting mosaic and the erecting mosaic of the optical system.*

*31. An optical apparatus in accordance with claim 8 in which at least some of the lenses of a lens mosaic are of the same focal length and the second means also includes an apertured plate positioned between the erecting lens mosaic and the composite final image surface.*

*32. An optical apparatus in accordance with claim 1, in which said image portions undergo vignetting to improve brightness uniformity in the final composite image.*

*33. An optical apparatus in accordance with claim 1 in which said optical elements are moved together over the object to scan the object wherein said optical elements are displaced in a direction transverse to the optic axes.*

*34. An optical apparatus according to claim 33 in which said optical elements are moved by a scanning means.*

*35. An optical apparatus in accordance with claim 1 in which said inverting elements form inverted intermediate images of reduced size between the inverting and erecting elements and the erecting elements erect and enlarge the intermediate images to form said image portions in the composite image plane, whereby overlapping of the inverted intermediate images formed by adjacent lens-pairs in the intermediate image plane is avoided.*

*36. An optical apparatus in accordance with claim 35 in which the object portions and final image portions of each lens-pair are larger than the diameters of the lenses, thereby enabling substantial overlapping of adjacent image portions.*

*37. An optical apparatus in accordance with claim 35 in which the optical system has unity magnification.*

References Cited

The following references, cited by the Examiner, are of record in the patented file of this patent or the original patent.

UNITED STATES PATENTS

| | | | |
|---|---|---|---|
| 3,451,752 | 6/1969 | Frank | 355—8 |
| 2,573,242 | 10/1951 | Bonnet | 95—18 P |
| 2,953,980 | 9/1960 | Montebello | 95—18 P |
| 3,113,484 | 12/1963 | Baker | 95—15 X |
| 2,736,235 | 2/1956 | Toulon | 350—190 |
| 3,221,591 | 12/1965 | Schepler | 350—213 |
| 3,447,438 | 6/1969 | Kaufer | 95—15 |

FOREIGN PATENTS

| | | | |
|---|---|---|---|
| 26,820 | 11/1912 | Great Britain | 352—69 |

JOHN M. HORAN, Primary Examiner

U.S. Cl. X.R.

355—50

UNITED STATES PATENT OFFICE

CERTIFICATE OF CORRECTION

Patent No. RE 28,162 Dated September 17, 1974

Inventor(s) Robert H. Anderson

It is certified that error appears in the above-identified patent and that said Letters Patent are hereby corrected as shown below:

Column 1, cancel "assignor to Tektronix, Inc., Beaverton, Oregon." (Assignment from Tektronix, Inc. back to Robert H. Anderson recorded in the United States Patent Office in Reel 2719, Frames 357 and 358).

Column 4, line 39, "3" should be --13--.

Column 5, line 55, "lense" should be --lens--.

Column 7, line 31, "the particular" should be --that particular--.

Column 8, line 16, "similar" should be --smaller--.

Column 8, line 32, "int othis" should be --into this--.

Column 9, line 10, delete "and the object" and insert -- of each lens pair of the lens --.
Column 16, line 11, claim 21, "lenses" should be -- lens --.

Signed and sealed this 31st day of December 1974.

(SEAL)
Attest:

McCOY M. GIBSON JR.
Attesting Officer

C. MARSHALL DANN
Commissioner of Patents